United States Patent [19]

Wu et al.

[11] Patent Number: 5,550,556
[45] Date of Patent: Aug. 27, 1996

[54] TRANSMITTING DATA AND COMMANDS TO DISPLAY MONITORS

[75] Inventors: Chin T. Wu, No. Brunswick; James V. Samuels, Monmouth Junction, both of N.J.

[73] Assignee: MultiVideo Labs, Inc., Princeton, N.J.

[21] Appl. No.: 145,864

[22] Filed: Nov. 1, 1993

[51] Int. Cl.[6] .................................. H04N 5/04; H04N 7/08
[52] U.S. Cl. ........................ 345/14; 345/22; 345/213; 348/476
[58] Field of Search ................................ 348/465, 471, 348/473, 476–479, 734, 189, 190, 512, 460, 725, 726, 727, 569; 358/168, 169; 345/2, 3, 132, 112, 204, 213, 153, 155, 156, 1, 14, 22, 27; H04N 7/08, 5/04

[56] References Cited

U.S. PATENT DOCUMENTS

| | | | |
|---|---|---|---|
| 4,500,880 | 2/1985 | Gomersall et al. | 345/2 |
| 4,920,503 | 4/1990 | Cook | 348/479 |
| 4,964,069 | 10/1990 | Ely | 345/132 |
| 4,965,557 | 10/1990 | Schepers et al. | 348/734 |
| 5,031,118 | 7/1991 | Morizot | 348/27 |
| 5,196,921 | 3/1993 | Megeid | 348/476 |
| 5,241,281 | 8/1993 | Wilkes et al. | 345/14 |
| 5,277,881 | 1/1994 | Wess et al. | 348/512 |
| 5,311,311 | 5/1994 | Harigai et al. | 348/473 |

FOREIGN PATENT DOCUMENTS 2250580  10/1990  Japan.

Primary Examiner—Steven J. Saras
Attorney, Agent, or Firm—Carl M. Wright

[57] ABSTRACT

Transmitting via color signals or vertical signals to control a computer's display monitor using software adjustments of the display parameters. A user can vary the display parameters including, for example, the contrast, brightness, horizontal and vertical size and position, inter alia, and transmit other commands and other data using codes transmitted with the color codes, or alternatively, with the vertical synchronization pulses.

8 Claims, 14 Drawing Sheets

0 1 0 1 0 0 0 1 0 1 0 1 0 0 0 0 0

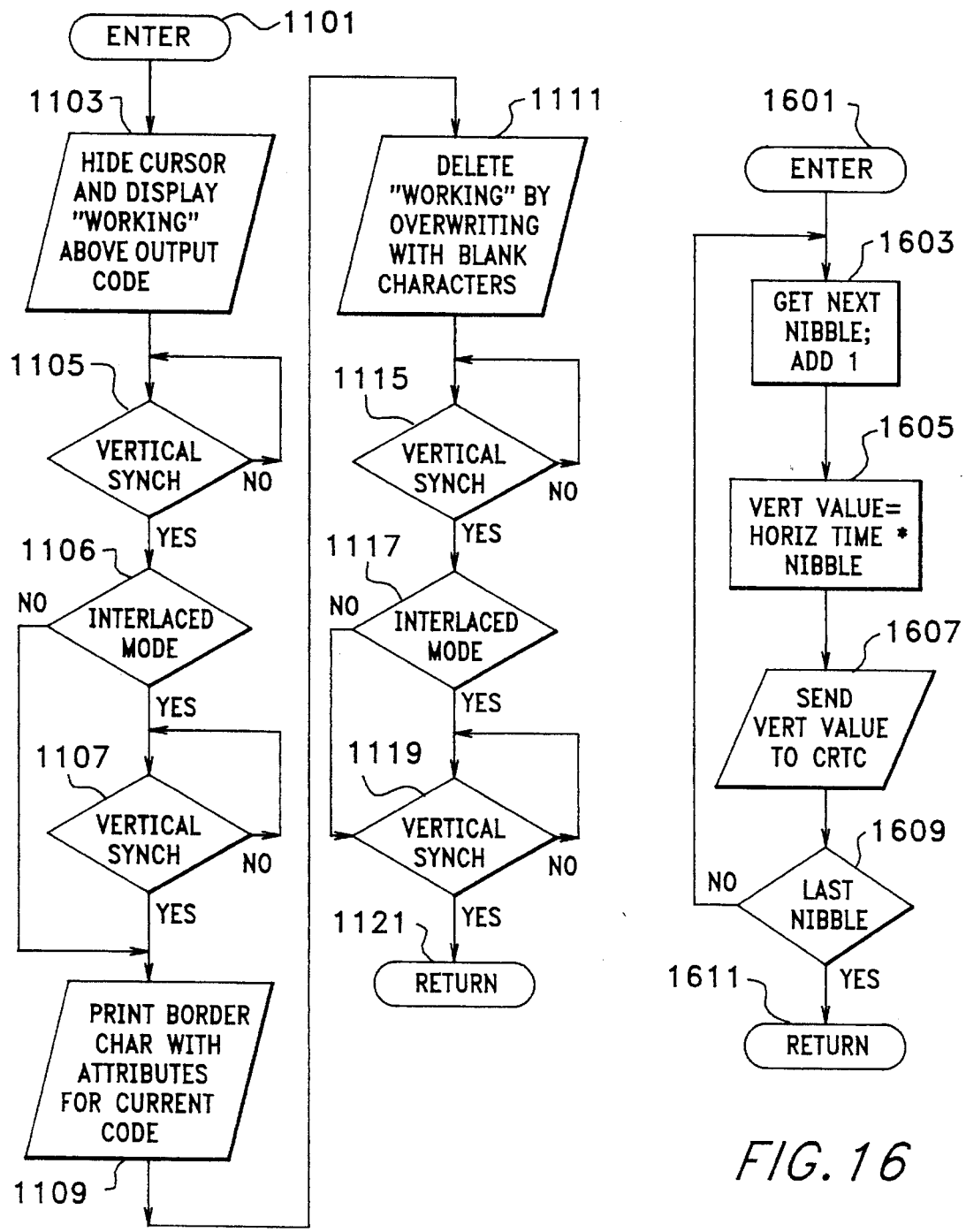

```
100  #define FALSE 0
101  #define TRUE !FALSE
102  #define NIBBLE 4

103  typedef char BYTE;

104  BYTE state = 0, bit_count = 0, frecog = 0, fnibble = 0;
105  BYTE code = 0, x, ardata[4] = {0, 0, 0, 0};

106  get_data()
107  {
108      [read input bit x];

109      if (frecog) { /* signature recognized - collect data */
110          if (bit_count < NIBBLE) {
111              ardata[code] <<= 1;
112              ardata[code] ||= x;
113              bit_count++;
114          } /* end if */
115          else {
116              bit_count = 0;
117              frecog = FALSE;
118              if (fnibble == 1) {
119                  fnibble = 0;
120                  code++;
121              } /* end if */
122              else fnibble = 1;
123          } /* end else */
```

FIG. 13A

```
124     if (code == 4) {
125        if (ardata[3] == ardata[0] + ardata[2]) {
126           control = ardata[0];
127           preset = ardata[1];
128           value = ardata[2];
129           [output control, preset, value];
130        } /* end if */
131        else [exit - return error message];
132     } /* end if */
133  } /* end if */
134  if (!frecog) { /* go through until signature recognized*/
135     if (x) { /* change state if x input is logical one */
136        switch (state) {
137           case 0:
138           case 5: state = 1; break;
139           case 1:
140           case 2:
141           case 4:
142           case 9: state = 2; break;
143           case 3: state = 4; break;
144           case 6: state = 7; break;
145           case 7: state = 8; break;
146           case 8: state = 9; break;
147           case 10: state = 11; break;
148           case 11: state = 0; frecog = TRUE; break;
149           default: [exit - return error number];
150        } /* end switch *
151     } /* end if */
```

*FIG. 13B*

```
152     else { /* change state if x input is logical 0 */
153        switch (state) {
154           case  0:
155           case  1:
156           case  3:
157           case  6:
158           case  7: state = 0; break;
159           case  2:
160           case  8:
161           case 10: state = 3; break;
162           case  4:
163           case 11: state = 5; break;
164           case  5: state = 6; break;
165           case  9: state = 10; break;
166           default: [exit - return error number];
167        } /* end switch */
168     } /* end else */
169  } '* end if */
170 } /* end program */
```

TRANSMITTING DATA AND COMMANDS TO DISPLAY MONITORS

BACKGROUND AND SUMMARY OF THE INVENTION

This invention relates to transmission of signals from a processor to a display monitor, including controlling the adjustments in the display monitor. Particularly, it relates to software control of monitor adjustments and, more particularly, to user control of the monitor adjustments via a software and hardware interface.

Conventional monitors, both color and monochrome, provide for manual user adjustments of display parameters such as contrast, brightness, horizontal and vertical positioning and size, tint, color balance, and pin cushioning, inter alia. Multifrequency monitors have several operating modes which increases the number of combinations of adjustments that a user can make.

Many computer display monitors employ analog signals which are derived and controlled by digital signals from microprocessor controllers within the monitor. Incorporating nonvolatile memories accommodates changes to the adjustments in different modes by recalling the settings automatically when switching among modes. The adjustments are made manually by the user, only the video and synchronization signals originating in and being sent from the attached processor.

It is an object of the invention to communicate between a computer and its display monitor using existing connections and signals to transmit control signals under software control to the display monitor.

It is an object of the invention to permit the user to make adjustments interactively from the processor. The adjustments are controlled by information supplied by the user, e.g., via a keyboard or mouse, and transmitted to the monitor as part of the video signals from the processor's video controller in a manner which requires no changes to either the video controller or the monitor that are already incorporated in the monitor.

It is a further object of the invention to allow user adjustments to be made to the monitor from the processor in real time, i.e., at any time.

In accordance with the invention a processor executing sequences of preprogrammed operations has an input means coupled to the processor for supplying coded input signals and a monitor for displaying information from the processor. The monitor includes controls for regulating the display attributes, e.g., contrast, brightness, and so forth. There is a monitor driver for coupling signals from the processor to the monitor and includes circuits for adding adjustment information signals to the signals to the monitor. The monitor includes a separator for receiving signals from the monitor driver and includes circuits for extracting the adjustment information signals, decoding the adjustment information, and coupling adjustment signals to the monitor controls.

BRIEF DESCRIPTION OF THE DRAWING

The invention is described in detail by referring to the various figures which illustrate specific embodiments of the invention, and wherein like numerals refer to like elements.

FIG. 11 is a flowchart of the subroutine SEND CURRENT CODE used in the program flowcharted in FIGS. 10A and 10B.

FIGS. 13A and 13B are C-type pseudocode of a program for decoding the data bits received from the processor.

FIG. 16 is a flowchart of a program for controlling the width of a vertical synchronization pulse to encode data.

DESCRIPTION OF THE PREFERRED EMBODIMENT

The CRTC registers on the video plug-in boards of personal computers (PC) are accessible by the user via communication ports. For example, one way of setting the registers is by use of an OUT instruction which causes the contents of a predetermined register to be coupled to the indicated port. These registers control the video timing such as the frequency, front porch, back porch, and the widths of vertical and horizontal synchronization pulses. In the invention, the control signals are sent to a separator by modulating the video signals. Alternatively, the control signals can be transmitted by varying the width of the vertical synchronization pulses. The vertical pulse can usually be set to one of sixteen different widths, all related to the horizontal period.

The control signals are sent from the processor to the monitor using the RGB color signals. False signals are eliminated by incorporating a special code called a signature code preceding the information. In the described embodiment, the information (adjustment data) is transmitted during successive vertical synchronization intervals.

In the monitor, the signals are decoded and used to control the adjustments. The data is accepted only when the signature code is correctly detected.

Figure 1:
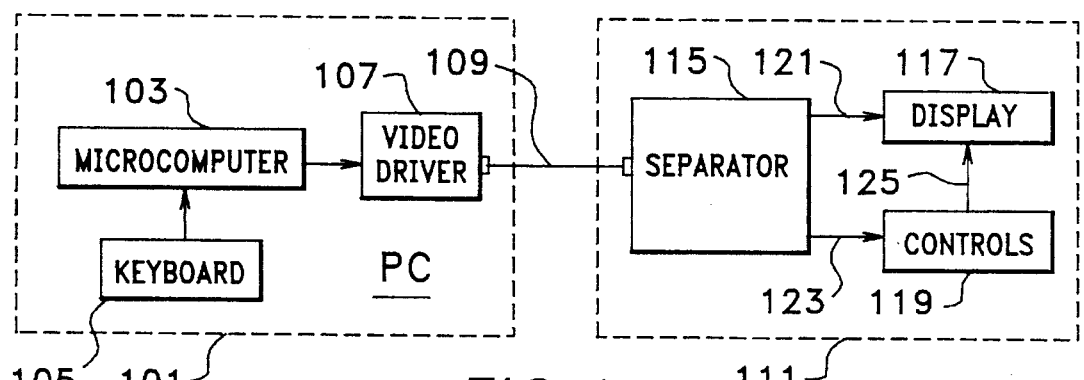
FIG. 1 is block diagram of a system according to the invention.

FIG. 1 shows the major components of a system according to the invention. A PC (processor) 101 includes a microcomputer 103 with a keyboard 105 connected and supplying signals to a video driver 107. The video driver, commonly but not necessarily comporting with the IBM Video Graphics Adapter standard, is connected to a monitor 111 via a cable 109. The monitor includes a separator 115 which receives signals from the video driver 107, the signals including RGB color signals and synchronizing signals.

The separator 115 extracts the control signals from the incoming signals and couples them to the control circuits 119 via a cable 123. The video signals are coupled to a display 117, which includes a visual screen, via a cable 121. The adjusted control signals are coupled from the control circuits 119 to the display 117 via a cable 125.

Figure 2:
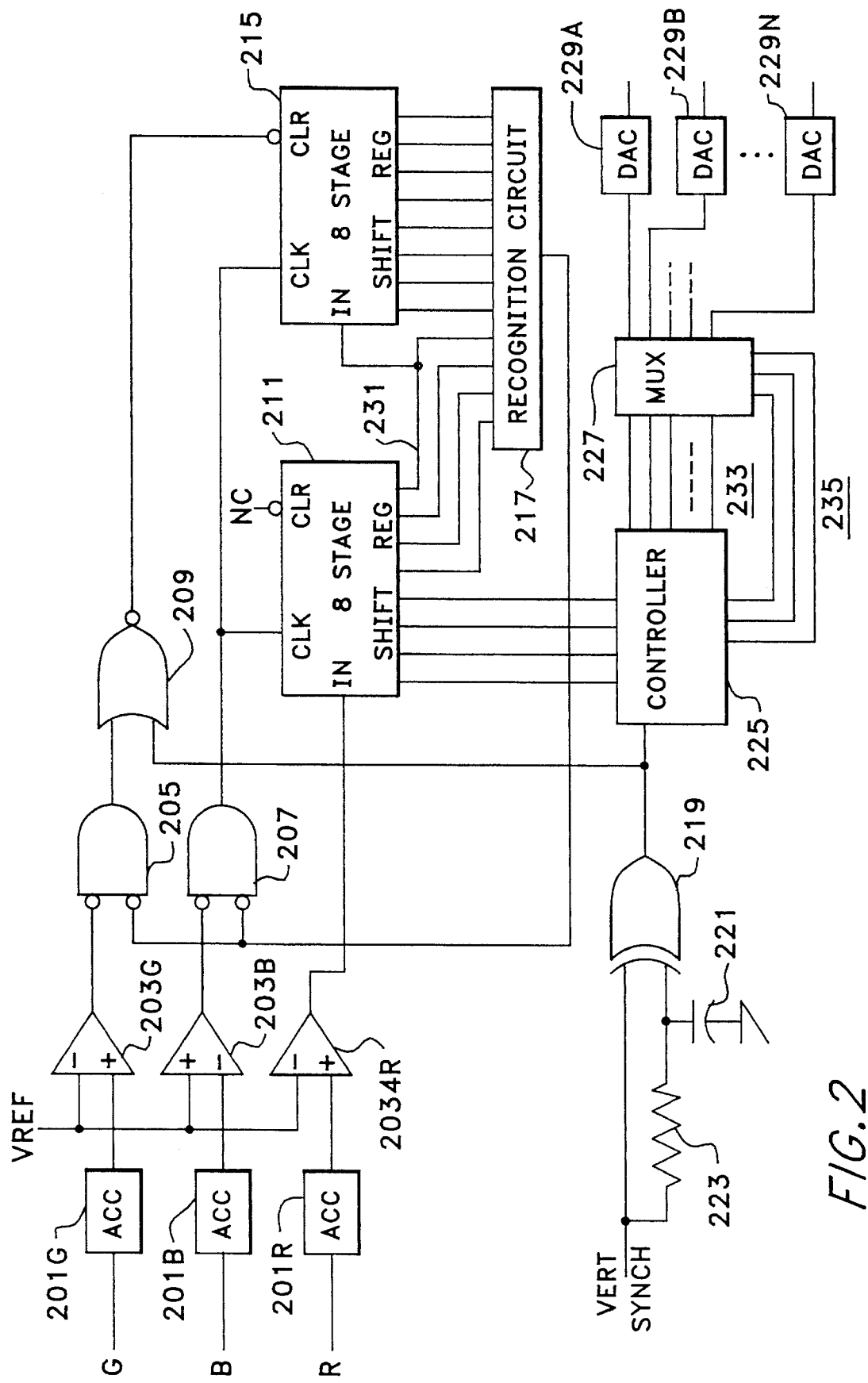
FIG. 2 is a block diagram of the separator of FIG. 1.

The receiving, detection, and decoding circuits of the separator 115 of FIG. 1 are shown in FIG. 2. The red (R), blue (B), and green (G) signals are received from the monitor driver board. The color signals are each coupled to an a.c. conditioning circuit (ACC), the red signal being coupled to the ACC 201R; the blue signal, to the ACC 201B; and the green signal to the ACC 201G. The a.c. conditioning circuits in this illustrative embodiment clamp the most negative voltage of the input color signals to approximately six volts. That is, if the incoming color signals vary typically between 0 to 0.7 volts, the output signals from the a.c. conditioning circuits vary between 6.0 to 6.7 volts.

The conditioned output signals from the a.c. conditioning circuits are each coupled to a comparator. The conditioned red signal is coupled to a comparator 203R and the conditioned blue and green signals are coupled to a comparator 203B and a comparator 203G, respectively.

The other input signal to the comparators 203R, 203B, and 203G is a reference voltage VREF. For the exemplary values of the input signals set forth above, the value of VREF would be set to approximately 6.35 volts. Therefore, when the conditioned red and green signals exceed 6.35 volts, the output signals from the comparators 203R and 203G, respectively, will change from a low potential (a logical zero) to a high potential (a logical one).

The comparator 203B is coupled so that when the conditioned blue signal falls below approximately 6.35 volts, the output signal changes from a logical zero to a logical one. The polarity of the signal connections to the comparators is exemplary only and can be coupled in different ways to supply the desired signal polarities at the comparators' output terminals.

The output signal from the comparator 203R, i.e., as derived from the red input color signal, represents data. The output signal from the comparator 203B, i.e., as derived from the blue input color signal, represents a clock signal. The output signal from the comparator 203G, i.e., as derived from the green input signal color signal, represents a control (enabling) signal. The function of the various signals derived from the color signals can be interchanged without any change in the inventive concept.

The data signals from the comparator 203R are coupled to the input terminal of an eight-stage shift register 211. The output signal from the eighth (output) stage of the eight-stage shift register 211 is coupled to the input terminal of a second eight-stage shift register 215 via a line 231.

The four most significant bits of the eight-stage shift register 211 (the most significant bit being the eighth stage of the eight-stage shift register) and the output bits from the eight-stage shift register 215 are coupled to a recognition circuit 217. The four least significant bits of the eight-stage shift register 211 are coupled to a controller 225. The twelve most significant bits (most significant four bits of the eight-stage shift register 211 and eight bits of the eight-stage shift register 215) are signature bits and the four least significant bits represent data.

The signature bits are a binary number indicating that the four data bits are valid. That is, the signature bits must match a predetermined sequence to identify that the four least significant bits are legitimate data. For example, the bit sequence

X X X X 1 1 0 1 1 1 0 0 1 0 1 1

(least significant bits first) would indicate that the X X X X bits are data.

When the signature bits are correct, an output signal from the recognition circuit 217 inhibits the clock (shift) signal to the eight-stage shift registers 211 and 215 and places a high signal on an input of a NOR gate 205 to prevent the loss of the enabling signal (green) from resetting the shift registers. The clock (shift) signal for the eight-stage shift registers 211 and 215 are supplied from a negative input AND (NOR) gate 207. While the signal from the recognition circuit 217 is low (logical 0), the NOR gate 207 is enabled and supplies a positive (logical 1) signal when the output signal from the comparator 203B goes low. When the output signal from the recognition circuit is high (logical 1), i.e., the proper signature bits are recognized, the NOR gate 207 is inhibited from passing more clock signals from the comparator 203B. This acts to hold the data bits in the eight-stage shift register 211.

A NOR gate 205 is coupled to the output signal from the recognition circuit 217 and also to the output signal from the comparator 203G. While the output signal from the recognition circuit is low (proper signature bits not recognized), a low output signal from the comparator 203G can cause the output signal from the NOR gate 205 to go high if the signature bits have not been identified. A high on either input of a NOR gate 209 produces a low output signal which acts to reset the shift register stages in the eight-stage shift register 215. Thus, program control can reset the high (most significant) bits of the signature bits.

The incoming vertical synchronizing signal from the monitor driver is coupled to an input terminal of an exclusive-OR (XOR) gate 219. It is also coupled to the other input terminal of the XOR gate 219 through a resistor 223. The other input terminal of the XOR gate 219 is also coupled to ground potential through a capacitor 221. When a vertical synchronizing signal is received, the logical signal on one terminal of the XOR gate 219 is different from the logical signal at the other terminal until the capacitor 221 charges (or discharges, depending on the polarity of the vertical synchronizing signal) to the vertical synchronizing signal input value. The time required to charge is determined by the values of the resistor 223 and the capacitor 221. Therefore, the output signal from the XOR gate 219 will be positive (logical 1) for a given period of time when a vertical synchronizing signal is received, regardless of the polarity or duration of the vertical synchronizing signal input signal.

The output signal from the XOR gate 219 is coupled to the controller 225 as an interrupt signal to indicate that the data bits from the eight-stage shift register 211 are valid and should be read. The output signal from the XOR gate 219 is also coupled to the NOR gate 209 to reset the stages of the eight-stage shift register 215.

The controller 225 can be a sequential state machine or a microprocessor such as the commercially available type 8051 programmed to accumulate and to translate the data bits to supply the proper signals to adjust the monitor controls as described below. The data bits are concatenated to form strings of any length as desired. For example, the following string, 1 0 1 0 0 0 1 0 1 0 1 0 0 0 0 0 may be viewed as indicating a start code (1 0 1) followed by an adjustment code (such as binary 2 signifying adjustment of, for example, the contrast control) with the last eight bits denoting the value to which the contrast code should be adjusted, e.g., 160. As illustrated, the controller accumulates four groups of four bits (nibbles) to effect the desired control.

To execute the control, the controller 225 couples the adjustment value bits to a multiplexor 227 via lines 233. The number of lines in the illustrative example is eight. A set of multiplexor control signals, e.g., from the adjustment code, is coupled to the multiplexor 227 via lines 235.

The adjustment value bits are gated to one of plurality of digital-to-analog converters 229A, 229B, . . . , 229N. The output signals from the digital-to-analog converters are coupled to the various analog adjustment circuits in the monitor. Alternatively, a single digital-to-analog converter can be installed between the controller 225 and the multiplexor 227, coupled to convert the signals on the lines 233 to analog values which are then routed to the proper control registers by the multiplexor 227. This eliminates the need for separate digital-to-analog converters for each control register.

Figure 3:
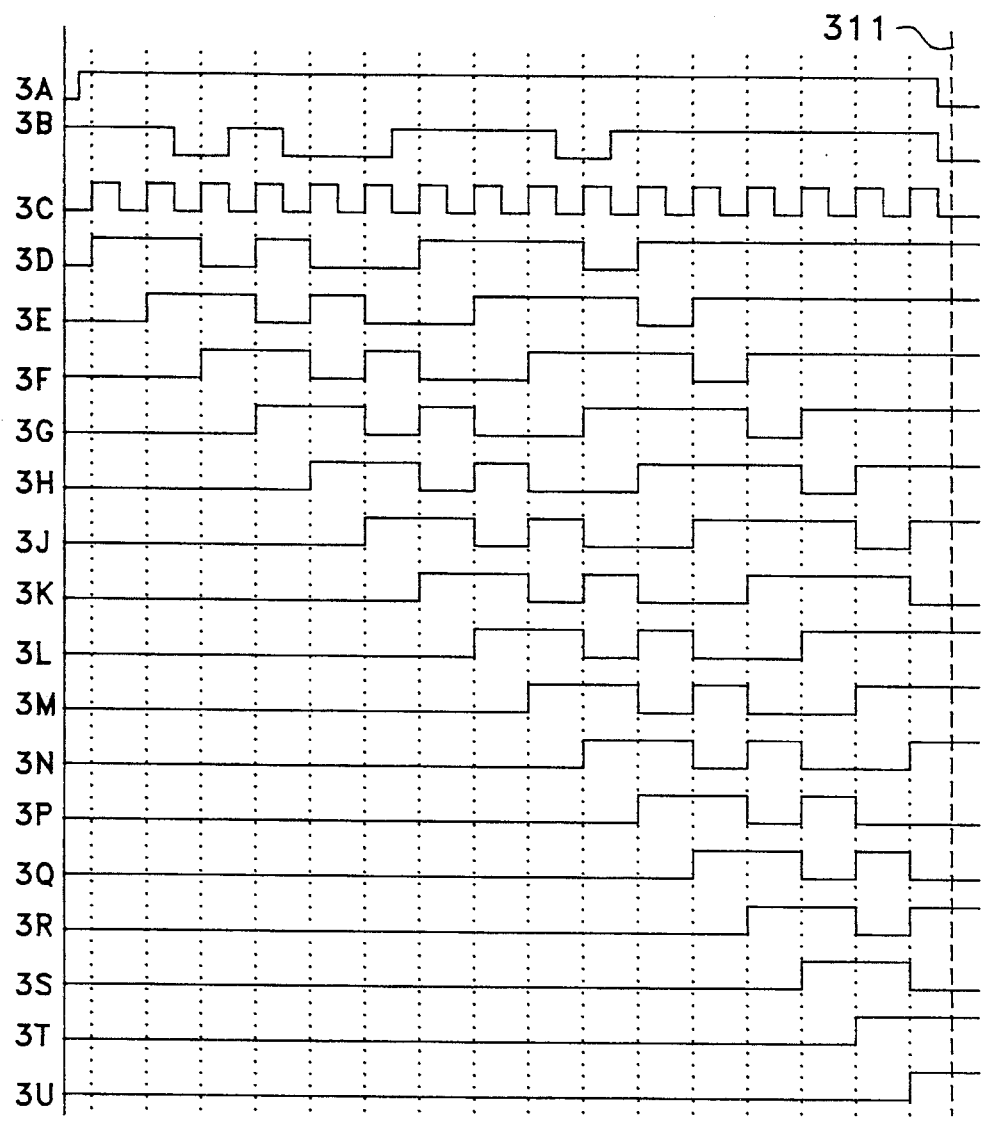
FIG. 3 is a timing diagram showing the relationships of the signals of FIG. 2.

The timing of the signals in the separator of FIG. 2 is shown in FIG. 3. FIGS. 3A, 3B, and 3C represent the green, red, and blue signals, respectively. The blue signal, FIG. 3C, is the clock input signal. The green signal, FIG. 3A, is an enabling signal that is high to indicate the blue and red signals are valid. The red signal, FIG. 3B, is the data signal.

The signals shown in FIG. 3D to FIG. 3U—there are no FIGS. 3I or 3O to avoid confusion with numerical characters—are the signals in the successive shift registers 211 and 215 of FIG. 2. The first shift register, FIG. 3D, is set at the rising edge of the clock pulses of FIG. 3C (blue signal) if the data signal of FIG. 3B (red signal) is high. That is, the state of the data signal is shifted into the first shift register by the clock signal which also shifts the data in the first register into the second, the second into the third, and so. The data is shifted through the 16 stages during a vertical interval. At the end of the 16th clock pulse, the data in the registers is as shown at the dashed line 311 in FIG. 3. Since the most significant bit was shifted in first, it has the state as shown in FIG. 3U. The sixteen data bits are therefore 1 1 0 1 0 0 1 1 1 0 1 1 1 1 1 1. The first twelve bits are decoded by the recognition circuit 217 (FIG. 2), thereby inhibiting the reset signal from the green signal and the clock from the blue signal as described in connection with FIG. 2.

The vertical synchronization pulse gates the data bits, i.e., the four least significant bits, 1 1 1 1 in the illustrative example, into the controller 225 (FIG. 2). The data bits are accumulated across four or more successive vertical intervals in the controller 225 to activate the adjustment controls as described below in more detail.

Figure 4:
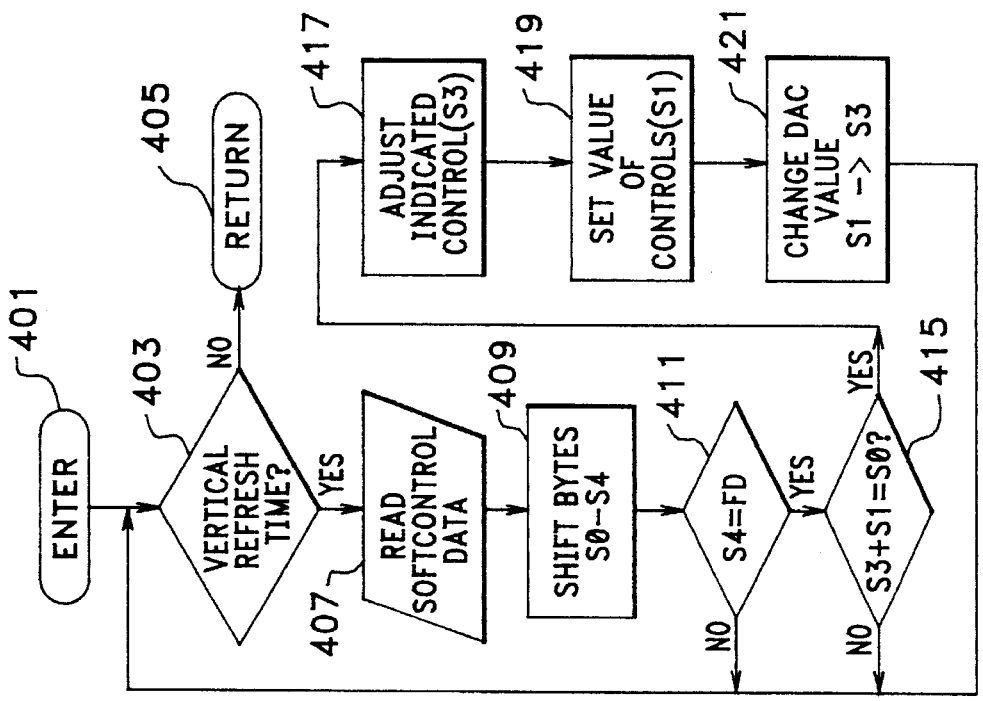
FIG. 4 is flowchart of the steps executed in the separator of FIG. 1.

A software program in the controller 225 is illustrated in the flowchart of FIG. 4. The software program can be written as if for a dedicated processor, i.e., continually cycling. In FIG. 4, however, it is written as a subroutine.

In the following description, references are made to the flowcharts depicting the sequence of operations performed by the program. The symbols used are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets but persons of ordinary skill in the art are familiar with the instruction sets with which they work and can implement the operations set forth in the blocks of the flowchart.

The program outputs one nibble (four binary bits) of data immediately following the 12-bit signature code. Five bytes, i.e., ten nibbles, are required for each adjustment, each nibble following in successive vertical retrace intervals. There is a START CODE, viz., FD (hexadecimal) that initializes the process. The controller then decodes successive bytes to determine whether an adjustment is to be made. Next is the CONTROL CODE which will have a value of 0 to 63 specifying the display parameter to be adjusted. This byte can be sent as 1 1 X X X X X X since only six bits are needed to specify values 0 through 63.

Next, a PRESET VALUE byte is transmitted and has a value of 1 through 254 which estimates the manufacturer's preset value. The next byte is the ADJUST VALUE ranging from 1 to 254 which specifies the adjustment value. Lastly, a CHECK SUM value equal to the sum of the CONTROL CODE and the ADJUST VALUE, modulo-255. This last byte provides an error check on the transmission of the adjustment data.

Presuming that the control code for adjusting the vertical size is E5, the following sequence of bytes would be sent during ten successive vertical retrace intervals (D 3 B are hexadecimal characters for the signature code):

| | | |
|---|---|---|
| Vertical Interval 1: D 3 B F | } | FD is the START code |
| Vertical Interval 2: D 3 B D | | |
| Vertical Interval 3: D 3 B E | } | E5 is the vertical size code |
| Vertical Interval 4: D 3 B 5 | | |
| Vertical Interval 5: D 3 B 8 | } | 80 (128 decimal) preset value |
| Vertical Interval 6: D 3 B 0 | | |
| Vertical Interval 7: D 3 B 6 | } | 60 (96 decimal) new value |
| Vertical Interval 8: D 3 B 0 | | |
| Vertical Interval 9: D 3 B 4 | } | 45 (E5 + 60 drop carry) checksum |
| Vertical Interval 10: D 3 B 5 | | |

The main execution program periodically calls the subroutine of FIG. 4 which begins at the ENTER terminal block 401. If it is not a vertical interval as tested in a decision block 403, the subroutine transfers back to the calling program via the terminal block 405. If it is a vertical interval and the recognition circuit has decoded a correct signature, the controller reads the control data in a input/output block 407. Next, a process block 409 shifts the received bytes and the data in the software byte register S4 is tested by a decision block 411. (Software registers S4 to S0 are five one-byte shift register stages, S4 being the most significant byte and S0 being the least significant byte.) If not equal to FD (hexadecimal numbers), the program control returns to the decision block 403 to determine whether it is still a vertical interval. If the test in the decision block 411 is true (S4 contains the FD, the START code), the contents of registers S3 (containing the control code) and S1 (containing the adjustment value) are added and compared to the contents of register S0 (containing a checksum value). If the checksum test fails, control returns to the decision block 403. If the checksum is correct, the controller 225 selects the adjustment to be made at a process block 417. This is accomplished by outputting appropriate control signals to the multiplexor 227 via lines 235. The adjustment values are then output via a process block 419 using lines 223 (FIG. 2).

Figure 8:
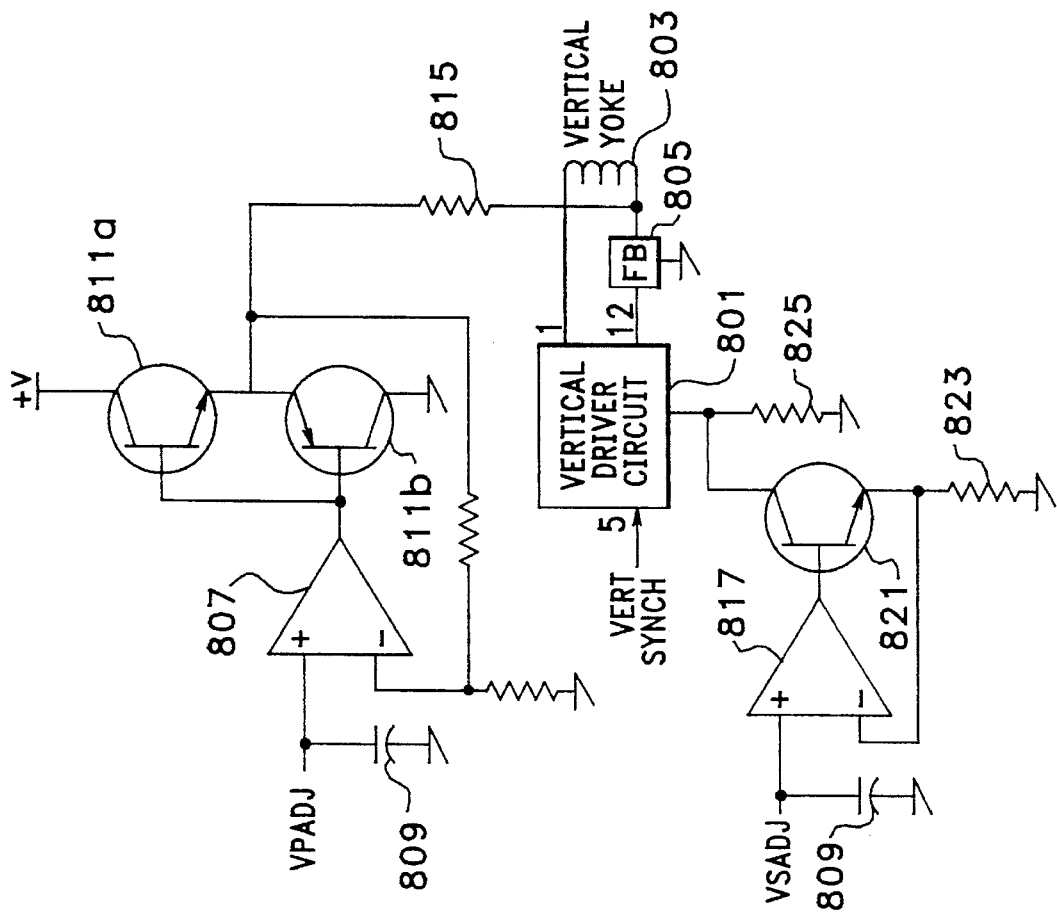
FIG. 8 is a schematic of a circuit illustrating control of the vertical position and size in response to signals from the separator of FIG. 1.
Figure 9:
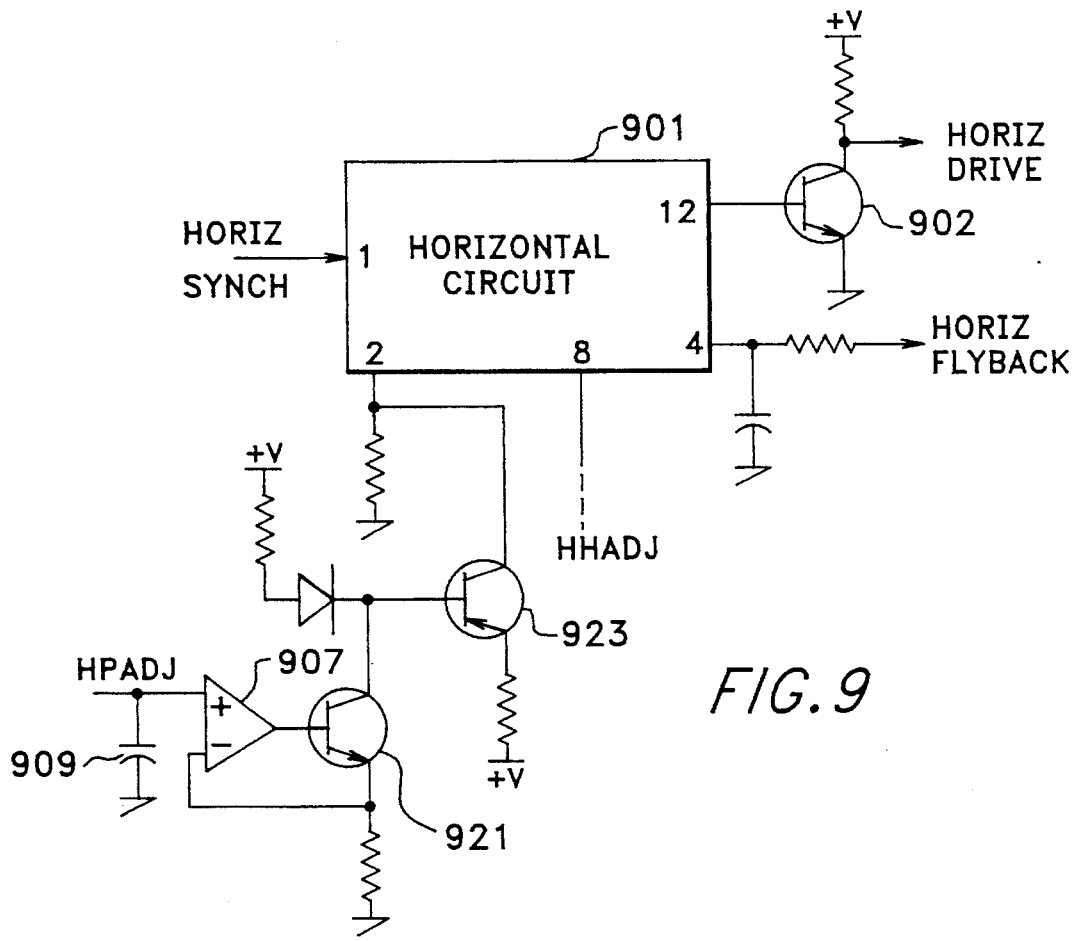
FIG. 9 is a schematic of a circuit illustrating control of the horizontal position and horizontal hold adjustments in response to signals from the separator of FIG. 1.

The circuits of FIGS. 8 and 9 are similar to those used in commercially available display monitors. An example is an AcerView 76 model manufactured by Acer.

The circuit of FIG. 8 illustrates the control of the vertical position and size adjustments. The signals VPADJ and VSADJ are the output signals from the digital-to-analog converters (DACs) 229 (FIG. 2). The vertical driver circuit 801 is an integrated circuit in the monitor that supplies the drive voltage to the vertical yoke 803. The pin numbers of the circuit 801 are those for the commercially available TDA1675 module. The circuits attached to the pins of the module are shown in the application notes for the TDA1675 chip. Those relating to the embodiment of the invention are shown. The vertical synchronization pulses are coupled into pin 5.

The vertical output drive signal is from pin 1 to the vertical yoke 803 and returns to pin 12 via a feedback network (FB) 805. By supplying an offset current to the return line from the vertical yoke 803, the vertical position can be adjusted. The VPADJ signal is applied from a DAC 229 to an operational amplifier 807 via the latter's noninverting input terminal. A capacitor 809 is also coupled to the noninverting terminal of the operational amplifier 807. Because the input impedance of the operational amplifier is nearly infinite, i.e., very large, the capacitor 809 acts to store or to hold the value of the VPADJ voltage.

The output signal from the operational amplifier 807 is coupled to the bases of two opposite polarity bipolar transistors 811a and 811b. The bipolar transistors 811a and 811b are connected in a circuit known as a double emitter follower which has a low output impedance. This double emitter follower matches the impedance of the operational amplifier 807 to the impedance of the vertical yoke circuit including a coupling resistor 815. The gain of the operational amplifier 807 is controlled by a feedback voltage divider to its inverting input terminal.

The vertical size circuit uses an operational amplifier 817 and a holding capacitor 819 which function as the amplifier 807 and the capacitor 809 described above. The output signal from the operational amplifier 817 is coupled to the base of a bipolar transistor 821. Feedback to the noninverting terminal of the operational amplifier 817 is supplied from a voltage divider comprising the Vbe voltage drop of the bipolar transistor 821 and a resistor 823 which stabilizes the output of the operational amplifier 817. The size determining impedance to pin 7 of the vertical driving circuit 801 is formed by two external impedances, viz., a resistor 825 and that formed by the bipolar transistor 821 in series with the resistor 823. By varying the voltage at the base of the bipolar transistor 821, the parallel impedance of the two external impedances, and hence the current from pin 7, is varied and acts as the equivalence of a voltage-controlled potentiometer (variable resistor). This changes the vertical size of the monitor display as though a potentiometer were coupled to pin 7 of the circuit 801.

The circuit of FIG. 9 shows the adjustment of the horizontal position (phase) and horizontal hold (phase lock) of the display by the output signals from the DACs 229 (FIG. 2). An operational amplifier 907 receives at its noninverting input terminal the horizontal position (phase) adjustment voltage signal (HPADJ) and has a holding capacitor 909 also coupled thereto. The operational amplifier output signal is coupled to a bipolar transistor 921 with a feedback via the emitter circuit as above described. The collector of the bipolar transistor 921 is coupled to the base of another bipolar transistor 923. This circuit, including the associated resistors function as an amplifier supplying an adjustment voltage to pin 2 of the horizontal circuit 901, commercially available as type LA7850.

An identical circuit couples the horizontal hold (phase lock) signal (HHADJ) to pin 8 of the horizontal circuit 901.

The above description shows the manner by which a digital value entered by a user from a processor is coupled to adjust the display of the monitor.

Figure 7:
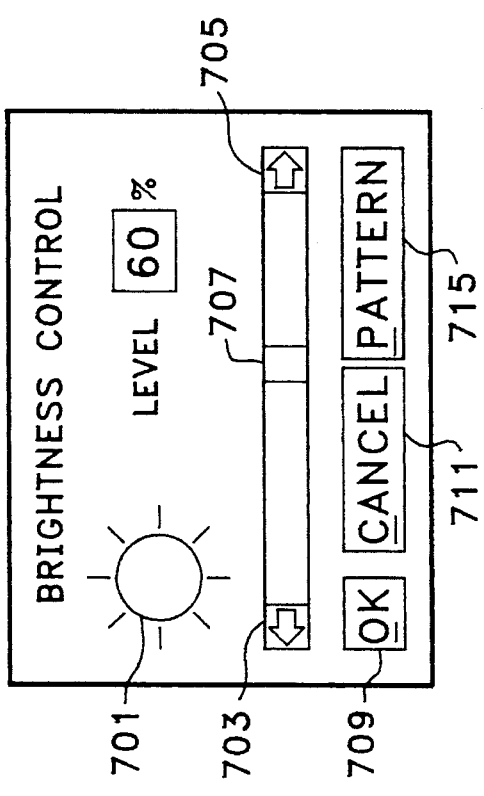
FIG. 7 is an illustration of an input prompt for adjustment values as displayed on the monitor screen.

The digital value of an adjustment can be entered from the keyboard 105 (FIG. 1), for example, using a function key to select which function is to be adjusted and the number keys to enter the value of the adjustment. This technique is well known in the art and need not be explained in detail for an understanding of the invention. Feedback to the user can be supplied in several ways, the simplest perhaps being to echo the function being adjusted and its value onto the monitor's screen. Another technique is to use a displayed format as shown in FIG. 7. In addition to or in lieu of a title indicating which control has been selected, a symbol 701 can be displayed which conveys to a user not familiar with English the adjustment being made. In addition to or in lieu of a numerical readout of the adjustment value, a moveable marker 707 which moves proportionately between two end boxes 703 and 705 supplies a visual indication of the adjustment value.

The end boxes 703 and 705 inform the user that the adjustment value can be varied with the left and right arrow keys, respectively, which are found on all PC keyboards or they may be clicked on with a mouse controlled cursor. A box 709 tells the user that pressing the O key will cause the processor to accept the set adjustment value. Another box 711 informs that pressing C key will cancel the function without changing the adjustment value. A third box 715 indicates that pressing the letter P will replace the present video display with a predetermined pattern character for the adjustment being made. These boxes may be clicked on with the mouse.

In some cases, it may be desirable to transmit the adjustment signals to the monitor by varying the vertical synchronization pulse width, e.g., to make adjustments to a monochrome monitor which does not use the color signals. This is done by varying the width of the vertical synchronizing signal from the PC. The vertical synchronization pulse width can be varied within reasonable limits without affecting the display.

When a new mode is initialized, the processor in the monitor measures the on-time of the vertical synchronization pulse signal and sets the time as a zero bit. Each vertical synchronization pulse is then measured. Any pulse greater than the on-time is considered a one bit and the others, a zero bit. The data thus received is used to modify monitor adjustments.

Figure 6A:
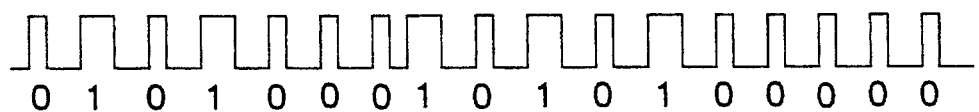
FIG. 6A is a timing diagram of vertical interval pulses encoded with adjustment data.

FIG. 6A is an exemplary series of vertical synchronization pulses for transmitting adjustment data to the monitor. A START code (1 0 1) is detected by the monitor and causes the next 13 bits, for example, to be captured as the adjustment data. In the example of FIG. 6A, the adjustment code (0 0 0 1 0) which, for illustrative purposes, indicates the contrast is to be adjusted and the adjustment data (1 0 1 0 0 0 0 0) is the value to which the contrast is to be adjusted.

Figure 6B:
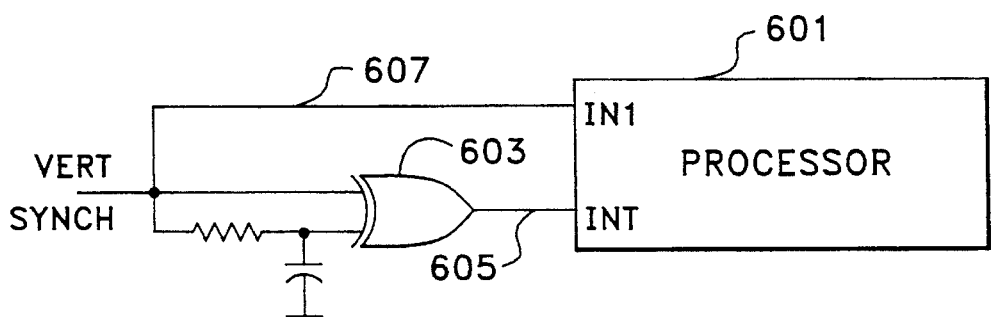
FIG. 6B is a schematic of a circuit for coupling the vertical synchronization pulse to the monitor's processor to supply the input signals for detecting the adjustment data transmitted via the vertical synchronization pulses.

The decoding can be done in the monitor's processor using a software program. FIG. 6B shows a connection to the monitor's processor 601. An XOR gate 603 is coupled as previously explained in connection with FIG. 2 to couple an interrupt signal via a line 605 to the processor 601. In addition, the vertical synchronization pulse is coupled to an input port (IN1) of the processor 601. The input port can be sensed under program control.

Figure 5:
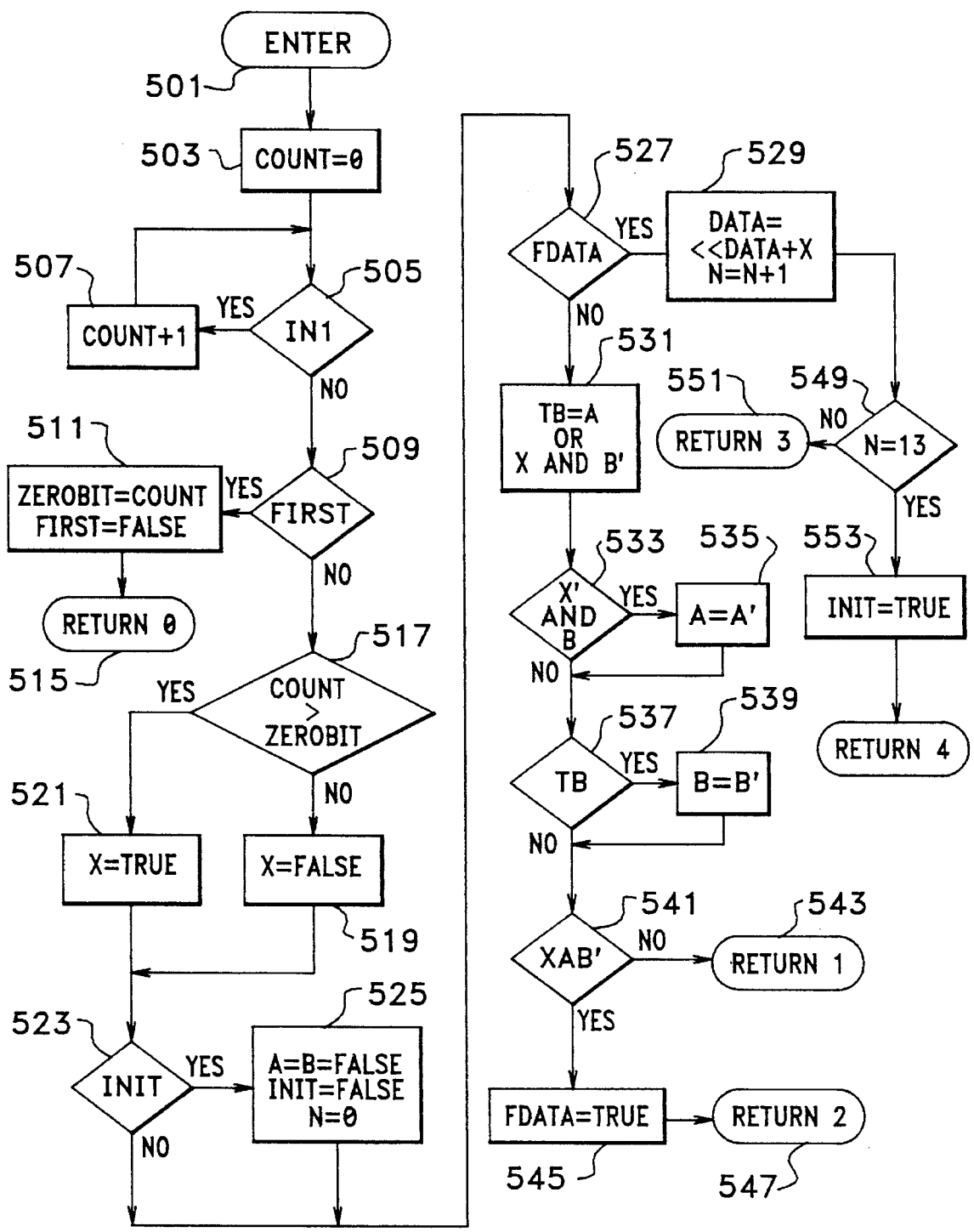
FIG. 5 is a flowchart of a program suitable for decoding adjustment data transmitted via the vertical synchronization pulses.

The flowchart of FIG. 5 recognizes the START code and extracts the adjustment data from a series of vertical synchronization pulses. The program, shown as a subroutine as discussed above, is entered at a terminal block 501 as a result of the vertical synchronization interrupt. At a process block 503, a count is set to zero.

If a decision block 505 senses that the port IN1 has a true value, i.e., the vertical synchronization pulse is present, then the count value is incremented by one in a process block 507. When the decision block 505 senses the vertical synchronization pulse is no longer present, a decision block 509 determines whether this is the first time the subroutine has been invoked in the new mode. Initiating a new mode sets the value FIRST to true. If the first time for the new mode, a process block 511 sets ZEROBIT to the count value detected which is the standard for determining subsequent bit values. Next, the subroutine returns a value of 0 to the calling program. The subroutine return values permit the main (calling) program to ascertain the stage from which the subroutine returned control.

After the first time the subroutine is invoked, the program continues at a decision block 517. If the count value is greater than the value of ZEROBIT, a logical variable X is set to true in a process block 521. Otherwise, a process block 519 sets the logical variable X to false.

Next, an INIT flag is sensed by a decision block 523 to determine whether it is the first pass of data. If so, logical variables A and B are set to false and the INIT flag is reset. A counter N is set to zero. Then a decision block 527 determines whether a START code has been detected, i.e., whether a logical flag FDATA, initially false, is true. If not, a process block 531 sets a logical variable TB to true if either the logical variable A or the logical variable X is true and the logical variable B is false.

A decision block 533 sets the logical variable A to its opposite state if the logical variable X is false and the logical variable B is true. That is, if the logical variable B is true and X is false and if the logical variable A is true, A is changed to false and if A is false, it is changed to true in a process block 535. In a similar way, a process block 539 changes the logical value of the logical variable B if a decision block 537 determines the logical variable TB has a value of true.

A decision block 541 then determines whether the three logical variables X, A, and B are all true. If not, then a START CODE has not been detected and a value of 1 is returned to the main program by a terminal block 543. If a START CODE has been detected, a process block 545 sets the FDATA flag to true and a terminal block 547 returns a value of 2 to the main program.

With the flag FDATA true, when the program reaches the decision block 527, the logical variable X is recognized as adjustment data and successive bits represented by the logical variable X are stored as data by a process block 529. When a data bit is received, the old data is shifted left (<<DATA) and the new bit concatenated as the least significant bit (+X). The value of N is incremented by one.

If a decision block 549 determines the value of N is not 13, i.e., all the data bits have not been received, then a terminal block 551 returns a value of 3 to the main program.

If all the data bits have been received, i.e., N=13, then a process block 553 sets the flag INIT to true to prepare the program to look for the next START CODE and returns a value of 4 to the main program which then decodes the data to perform the adjustment in a manner similar to that already described above.

To send the commands to the display monitor via control signals embedded in the color signals entails affecting the display itself since the control signals show up with the signals on the display. A preferred embodiment of the invention includes encoding the command or control signals with the least effect on the display. This is explained in the following description of a software embodiment of the process of accepting the user's input and sending the data to the display monitor. The following description is based principally on a DOS (Disk Operating System) but alternatives related to graphics-based environments, e.g., Windows and Mac (other widely used operating systems), are noted where applicable.

Figure 10A:
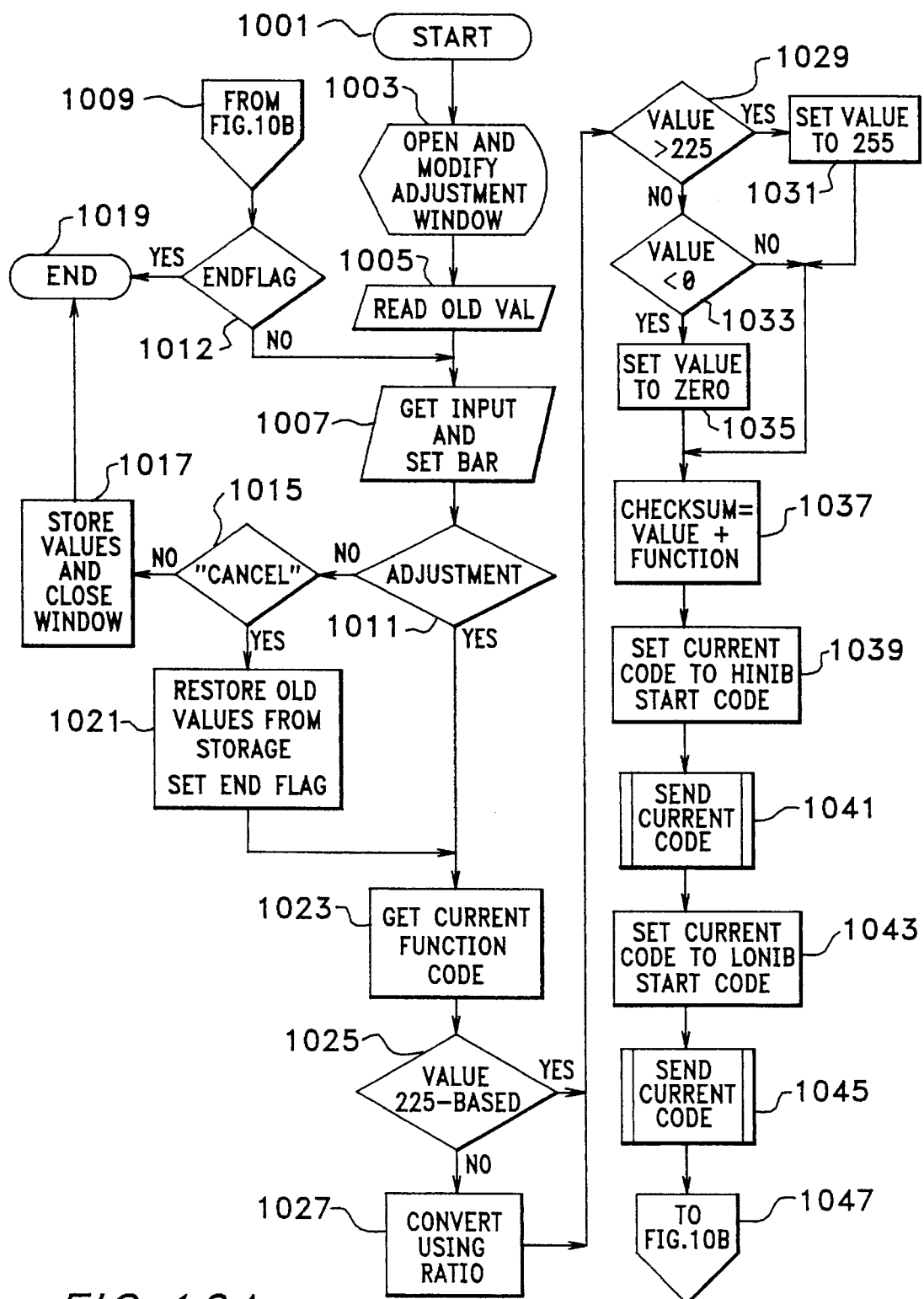
FIGS. 10A and 10B are a flowchart illustrating the steps of transmitting control signals using the color signals.

FIG. 10A is a flowchart of the input process beginning with a terminal block 1001. The adjustment window (see FIG. 7) on the display monitor is opened and modified by a display block 1003. To hide the output code, the border of the window is dashed by changing the attributes, e.g., the colors, of the characters forming the border. The ATTENTION code (D3BF) is printed in the lower left corner of the window and the value is encoded using the attributes of the characters. In a graphics-based environment, the output code is hidden in a rectangle placed within the windows border. A bitmap encoding the ATTENTION code (D3BF) is placed in the upper left hand corner of the dashed rectangle.

Each bit is encoded using two characters. A logical one bit is a yellow character followed by a white character. A logical zero is encoded as a green character followed by a cyan character. Yellow is created by turning on the red and green guns; cyan, the green and blue guns. White is created by turning on all the guns, i.e., red, green, and blue. In a graphics-based environment, each logical bit is broken into two parts, each being a predetermined number of pixels based on the frequency and resolution of the current video mode. This is to insure that the video information does not exceed the bandwidth of the decoding circuits. If the video information is sent at too high a frequency, the decoding circuits will be unable to decode it correctly. Therefore, the program has to determine the number of pixels that would create a compatible clock frequency.

The user presses a function key or some combination of keys ("hot keys") on the keyboard to select the adjustment to be made. Alternatively, a mouse can be used to select an icon or box on the screen to select the adjustment to be made. These operations are well known and need not be explained in detail for an understanding of the invention or the manner of making and using it.

An input/output block 1005 reads the old values from storage and positions the bar on the display accordingly. When the user changes the position of the bar or inputs a new value with the number keys on the keyboard (see FIG. 7), the new value is sent to the monitor (as described below) and the bar in the window is moved in an input/output block 1007.

If an adjustment was made by the user as determined in a decision block 1011, the current function (adjustment to be made) code is obtained in a process block 1023. If the user selects "CANCEL" as determined in a decision block 1015, then the old values are restored from storage and an EndFlag is set in a process block 1021 before fetching the function code. If "CANCEL" was not selected, the window is closed and the values stored by a process block 1017 and the process is ended by a terminal block 1019.

After the function code is fetched, the adjustment value is checked in a decision block 1025 to determine whether it corresponds to a value based on 255 levels. If not, it is converted by using a ratio factor of 2.55, i.e., 255/100, in a process block 1027.

Otherwise (or after conversion), the value is set to 255 if it is greater than 255 by a decision block 1029 and a process block 1031. If it is less than zero, it is set to zero by a decision block 1033 and a process block 1035.

Next, the checksum value is calculated by a process block 1037 by adding the adjustment value and the code value of the function as previously explained. The current code is set by a process block 1039 to the high nibble (HINIB) of the start code (FD). The high nibble consists of the four most significant bits of a byte, e.g., 1 1 1 1 for the F in the start code. The low nibble (LONIB) consists of the four least significant bits of a byte, e.g., 1 1 0 1 for the D in the start code. (In the interlaced mode, adjacent scan lines occur during successive fields, i.e., during alternate vertical signals.)

A subroutine 1041 sends the current code to the display monitor. The send current code subroutine is shown in the flow chart of FIG. 11. The subroutine is entered at a terminal block 1101. The display is adjusted by an input/output block 1103 by hiding the cursor, i.e., turning it off, and, if in a DOS environment, displaying the word "WORKING" above the output code in the adjustment window.

A decision block 1105 checks for a vertical synchronization period until there is one. If in the interlaced mode, as determined by a decision block 1106, a decision block 1107 waits for the next vertical synchronization period. If not in the interlace mode or at the second vertical synchronization period, an input/output block prints the border characters with the attributes for the current code.

In a DOS environment, an input/output block 1111 then deletes the displayed word "WORKING" by overwriting it with blank (space) characters. Then three decision blocks 1115, 1117, and 1119 check for one or two vertical synchronization signals, depending on whether it is in the interlace mode. The subroutine is then exited by a terminal block 1121. In a DOS environment, the transmission of the border characters to the display monitor carried the current code by the attributes of the modified border characters. In a graphics-based environment, the current code is carried by the correct bit map being drawn on the screen. The current code is retrieved at the display monitor as explained below.

In FIG. 10A, a process block 1043 sets the current code to the low nibble of the start code and the send code subroutine at block 1045 is invoked to transmit the current code as previously described. The process continues on FIG. 10B as indicated by an off page connector 1047.

Figure 10B:
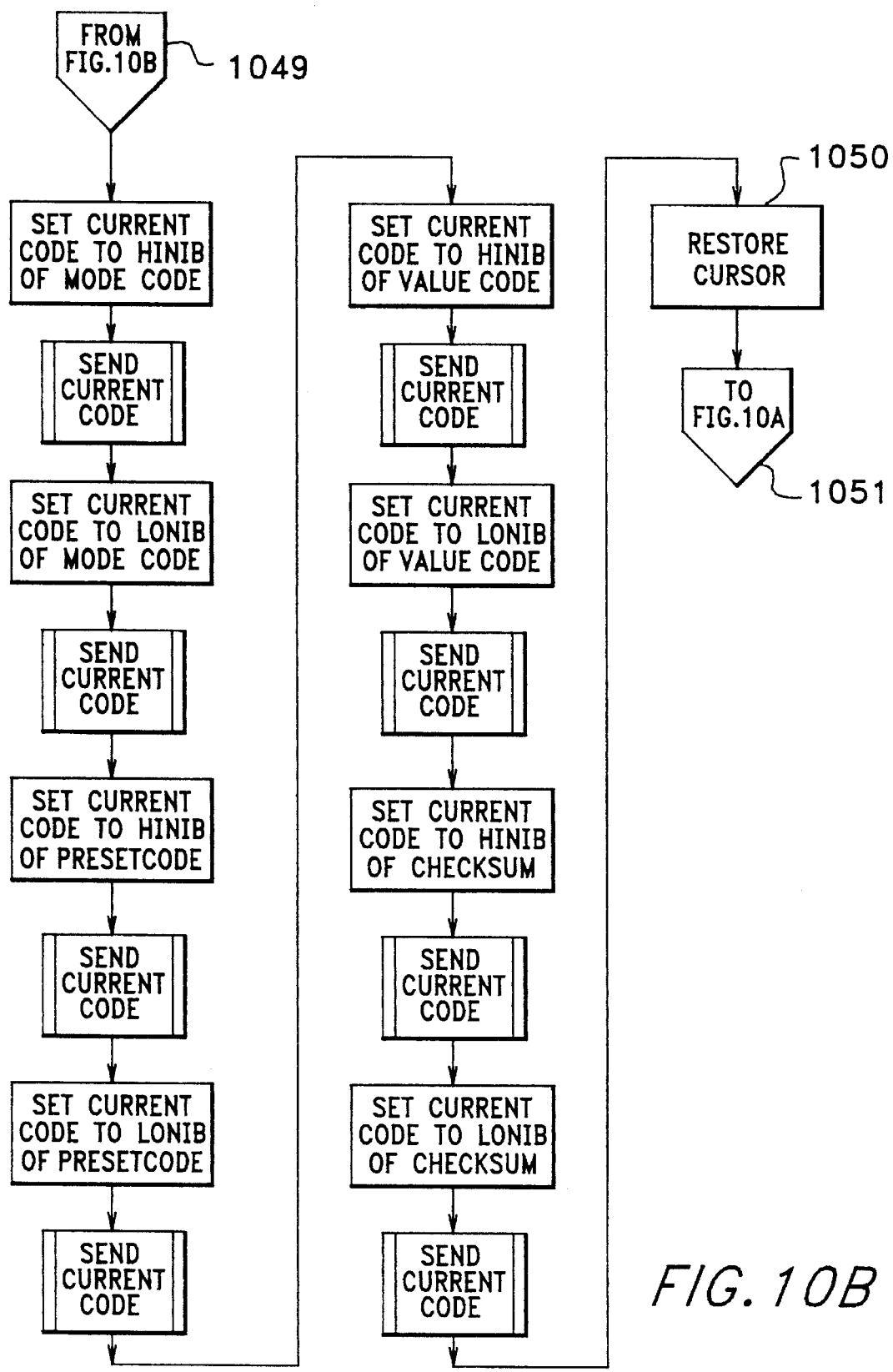

FIG. 10B illustrates the manner by which the remaining adjustment codes are sent to the display monitor. Entered via an off page connector 1049 (corresponding to the off page connector 1047 of FIG. 10A), the high and low nibbles of the mode code, preset code, adjustment value, and checksum are sent successively by setting their values into the current code and then invoking the send current code subroutine. When all the nibbles have been sent, the cursor is restored by a process block 1050. At the end of the process, an off page connector 1051 indicates a return to the flow chart of FIG. 10A via an off page connector 1009 that resumes the process at the input/output block 1007 if the EndFlag is not set or ends the process at the terminal block 1019 if the EndFlag is set.

Figure 12:
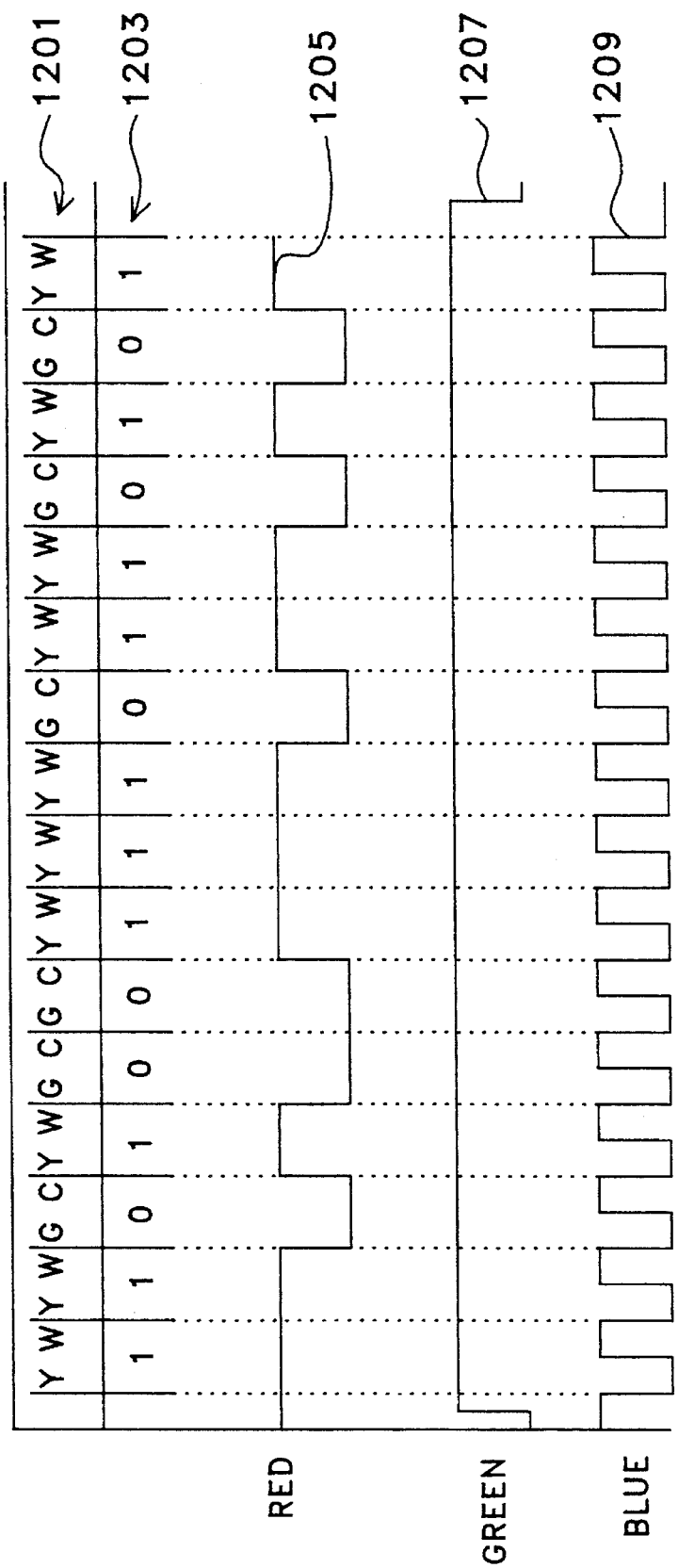
FIG. 12 is an illustration of a video raster line carrying encoded information to the display monitor from the processor.

FIG. 12 shows the relation of the characters' color to the data signals. A line of pixels 1201, coded for the signature bit sequence 1 1 0 1 0 0 1 1 1 0 1 1 and a data sequence of 0 1 0 1, is encoded using the above-described color encoding of logical zeros and ones and is placed within the border, for example, of the displayed control box. The line of pixels 1201 is typically a raster line of the video display that occurs between two raster lines of white pixels.

The line 1203 shows the bits encoded in the raster line 1201 delineated into bit cells. The resulting red signal (data) 1205, green signal (enabling) 1207, and blue signal clock) 1209 are illustrated as they correspond to the data carried by the raster line 1209. The decoding of the color signals was described and explained above.

A pseudocode procedure for retrieving the data from the color signals is shown in FIGS. 13A and 13B. It is written using C language format which is one of the most common programming languages now used for microprogramming. Lines 100–105 set initial conditions and define constants. Several variables are initialized as characters (char) which, in effect, sets aside a single byte of storage which is sufficient for each value and can be used as numerical values. Therefore, the character variables are identified as bytes using the typedef operator.

The variables are state (identifies the state the state machine is in and is initially 0), bit_count (keeps track of the number of data bits accumulated in a nibble), frecog (indicates whether the signature bits have been recognized), fnibble (signifies which nibble of a byte is being received), code (selects the control data byte), and an array of four bytes, ardata (contains the adjustment data).

Line 106 identifies the program module. The curly braces ({,}) indicate the start and end of blocks, the brace on line 107 indicating the start of the program module. Line 108 is the pseudocode for reading in the present bit, x.

Lines 109–133 assembles the bits into the control bytes after the signature bits are recognized. Lines 134–170 constitute a state machine to recognize the signature bits.

Line 109 tests the frecog flag and, if true, accumulates the data bits, the four bits following the signature bits as explained above. Lines 110–114 accumulate the four bits of the present nibble into the data array for the byte indicated by the variable code which is initially zero. The first code byte is the control code identifying the adjustment to be made. Line 111 shifts the bits one position to the left and line 112 logically ORs the input bit, x, into the byte. Line 113 increments the bit count until four bits, the number defined by NIBBLE, have been accumulated.

If four bits have not been accumulated, i.e., bit_count is less than four, lines 115–123 are skipped. If a nibble (four bits) has been accumulated, then lines 110–114 are skipped and lines 115–123 are executed to advance to the next nibble or, if a byte has been accumulated, to the next byte. Line 116 resets the bit_-count value to zero to start a new nibble. Line 117 resets the frecog flag to recognize the next nibble's signature. Lines 118–123 set the nibble flag, fnibble, to the first nibble (=0) if the second nibble has been collected or to the second nibble (=1) if the first nibble has been collected. If the second nibble is accumulated, then the value of code is incremented to start accumulating the next byte.

After all the bytes have been received, i.e., the value of code is four, lines 125–130 output the control, preset, and adjust values if the value of the checksum is equal to the sum of the control and adjustment value as determined at line 125. (Since the variables occupy only one byte, any carry from the sum is dropped.) If the checksum is not correct, then line 131 exits from the program, returning an error number to the main program to identify the error.

Error recovery is a common procedure in application programs and need not be explained in detail for an understanding of the invention.

Line 133 ends the program segment that collects the data bits if the signature is recognized, i.e., frecog is true. If frecog is false, lines 109–133 are skipped and the program segment from line 134 to line 170, making up a sequential state machine, is executed.

If frecog is false (! denotes logical NOT) at line 134, lines 135–151 are executed if the present input bit, x, is a logical one, i.e., true. A switch operation from lines 136–150 selects a case statement depending on the value of the variable state which is initially zero. In other words, the present state and the value of x determine which state is to be selected. For instance, if the present state is 0 or 5, then state 1 is selected. (The break operation causes the switch operation to end.) State 2 is selected if the present state is 1, 2, 4, or 9. Each state leads to another state or to itself, the sequence of states being controlled by the sequence of input bits.

Lines 152–167 determine the next state if the input bit is a logical zero, i.e., false. Lines 149 and 166 are default choices which are selected if none of the case states are found. Since there are only 11 states, failure to recognize one of these states indicate an error condition. Therefore, the default cases exit the program, returning an appropriate error number to the main program for purposes of error recovery.

Each time a bit is received, the sequential state machine of lines 134–170 are executed until the proper sequence of bits forming the signature code are recognized. The recognition flag, frecog, is set to true if the state 11 is reached and a logical one bit is received. This is performed at line 148 which not only sets the frecog flag but also sets the state to zero, the initial state for the next nibble. With the frecog flag set to true, the data accumulation segment of lines 109 through 133 is executed to accumulate the next nibble following the recognized signature sequence.

The signature sequence is from state 0 through state 11 but if a break in the sequence occurs, the sequence resumes at a state which is a continuation of the correct code. For example, the correct sequence of signature bits is 1 1 0 1 0 0 1 1 1 1 0 1 (hexadecimal D3B) which traverses states 0 through 11. If, for example, the sequence received is 1 1 0 1 0 0 1 1 1 0 1 0. This final zero invalidates the sequence up to that point but instead of returning to state 0, the sequence returns to state 5. This would detect the correct sequence if 0 1 1 1 0 1 1 follows the above incomplete sequence.

Figure 14:
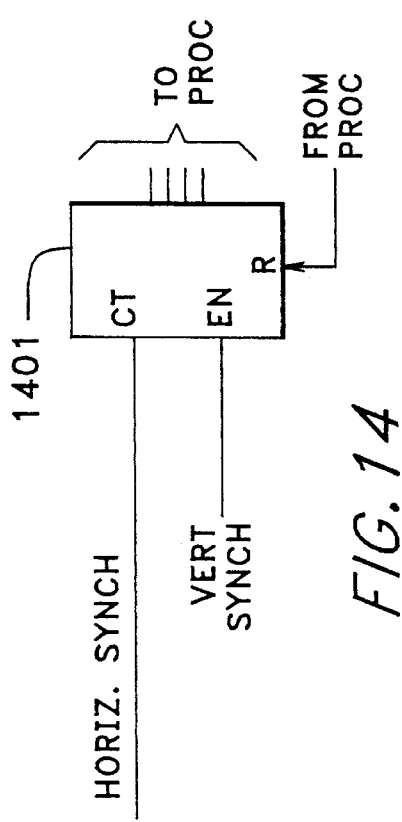
FIG. 14 is a block diagram showing the connections to a counter in the display monitor for detecting data encoded by varying the length of vertical synchronization pulses.

FIGS. 14, 15, 16, and 17 illustrate an alternate embodiment of transmitting signals and commands to the display monitor using the vertical synchronizing pulse width. In FIG. 14, the vertical synchronization signal is coupled to the enable input terminal of a four bit counter 1401 and to the interrupt input terminal of the monitor's processor. The horizontal synchronization pulses are coupled to the count input terminal of the counter 1401. The output bits are coupled to the data-in terminals of the monitor's processor. The count in the counter 1401 will be equal to the number of horizontal synchronization pulses that occurred during the vertical synchronization pulse less one, assuming the vertical synchronization pulse occurs at a horizontal synchronization pulse.

The counter is reset by a signal from the processor after each nibble (four bit count) is read from the counter. FIG. 15A shows a series of horizontal synchronization pulses that occur while the vertical synchronization pulses are present. For example, during a vertical synchronization pulse 1501, there are 16 horizontal synchronization pulses so the counter will count 15 (binary 1 1 1 1) which is the hexadecimal character F. During the next vertical synchronization pulse, the counter 1401 will count 13 (1 1 0 1) which is the hexadecimal character D. Counts for the successive synchronization pulses will be 14 (E), 5, 8, 0, 6 (followed by 0, 4, and 5 not shown). The FD (start code), E5 (control code), 80 (preset code), 60 (adjustment value), and 45 (checksum) are the data used in the previous example.

A software counter similar to that explained in connection with FIG. 5 can be used in place of a hardware counter.

Figure 15:
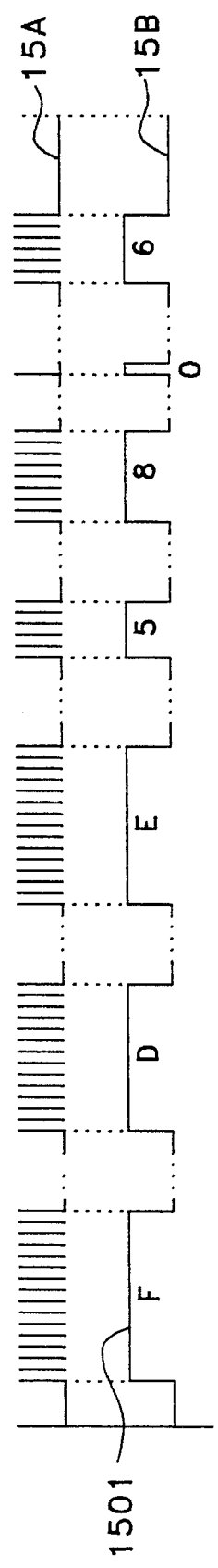
FIG. 15 is a timing diagram illustrating transmission of the start code using variable length vertical synchronization pulses.

FIG. 16 is a flowchart of a program for the processor (101 in FIG. 1) to encode the vertical synchronization pulses of FIG. 15 to display monitor. When an adjustment is to be made, the program is entered at a terminal block 1601 and gets the next nibble to be translated at a process block 1603. After fetching the nibble, a value of one is added to it. At a process block 1605, the length of the vertical synchronization pulse is determined by multiplying the horizontal interval time by the nibble value. The vertical value is sent to the CRTC by an input/output block 1607. If the last nibble has been processed as determined in a decision block 1609 (using a counter or address match), the program returns via a terminal block 1611. If more nibbles are to be sent to the monitor, the program resumes at the process block 1603.

Figure 17:
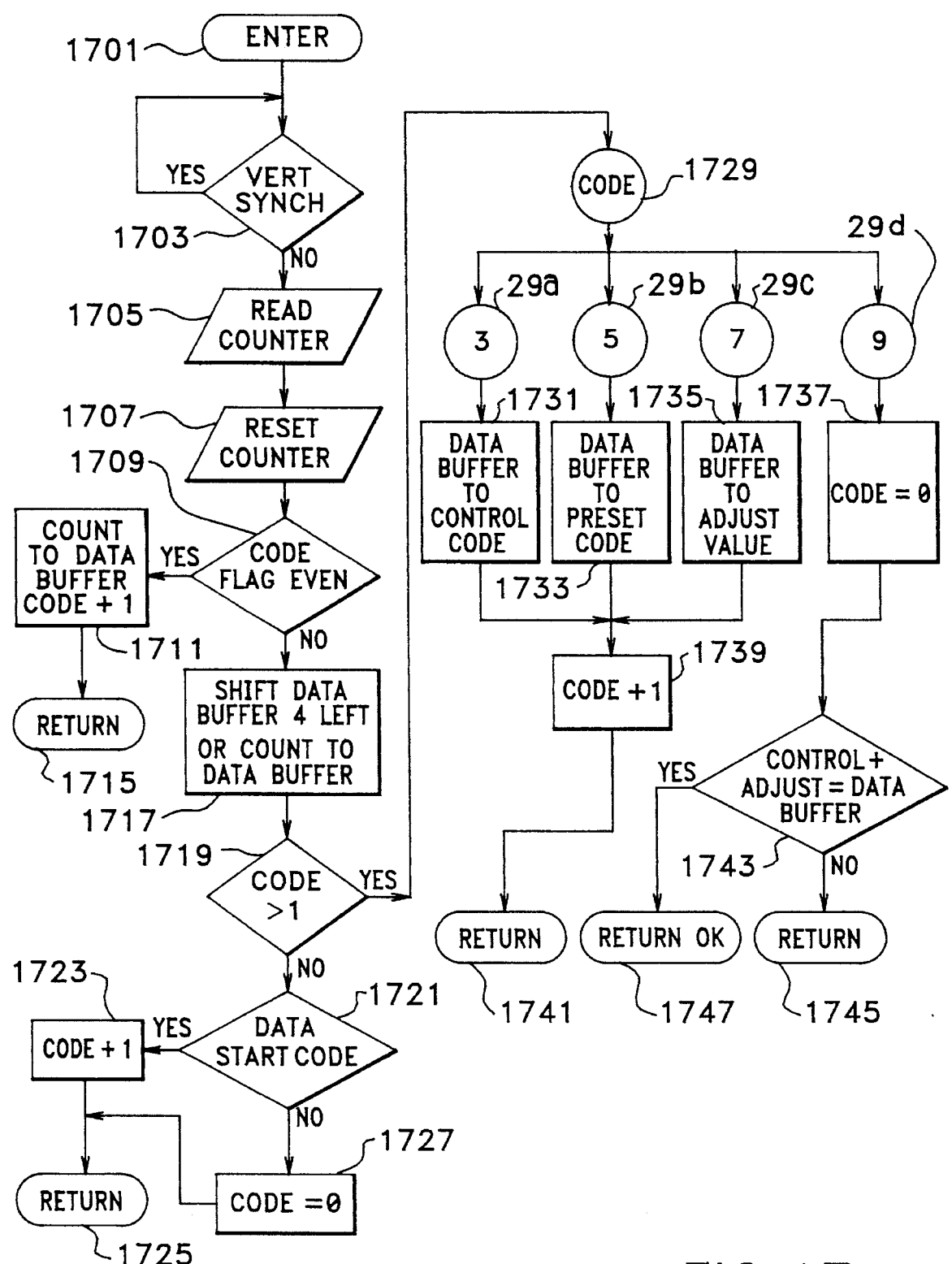
FIG. 17 is a flowchart of a program for accumulating the data transmitted by varying the width of vertical synchronization pulses.

The processor in the display monitor decodes the adjustment data according to the flowchart of FIG. 17. The subroutine of FIG. 17 is entered at a terminal block 1701 when a vertical pulse is detected, e.g., via an interrupt. At a decision block 1703, the program waits for the end of the vertical synchronization pulse. When the vertical synchronization pulse ends, the counter is read at an input/output block 1705 and, at a succeeding input/output block 1707, the counter is reset.

A decision block 1709 determines whether a code counter, initially zero, is even. When the code counter is even, it indicates the first nibble of a byte has been received so the count value is stored in a data buffer, e.g., a byte register, at a process block 1711, which also increments the code counter by one, and the program returns to the main program via a terminal block 1715. When the code counter is odd, a process block 1717 shifts the contents of the data buffer left four bits and the new nibble is ORed into the data buffer.

If the code counter is not greater than one at a decision block 1719, then the contents of the data buffer are compared to the start code, FD in the illustrative example, by a decision block 1721. If the byte is the start code, then the code counter is incremented at a process block 1723 and the program returns to the main program at a terminal block 1725. If the byte is not the start code, the code counter is set to zero by a process block 1727 before returning to the calling program. By setting the code counter to zero, the next two nibbles will be treated as the first byte.

When the first byte is the start code, then a switch connector 1729 causes the program to continue at one of four places. If the code counter is 3, then a connector 29a causes the byte in the data buffer to be transferred to the control code register by a process block 1731. (The code connector 1729 can be implemented as the switch operation in FIG. 13B.)

When the code counter is 5, the data buffer is transferred to the preset code register by a connector 29b and a process block 1733. When the code counter is 7, the data buffer is transferred to the adjustment value register via a connector 29c and a process block 1735.

When the data buffer has been transferred to the appropriate register, then a process block 1739 increments the code. The program then returns to the main program.

When the code counter is 9, the data buffer contains the checksum which is compared to the sum of the contents of the control code and adjustment value registers in a decision block 1743 after the code counter is set to zero by a process block 1737 via a connector 29d. If the checksum is invalid, then the program returns via a terminal block 1745. Setting the code counter to zero restarts the entire process.

If the checksum is valid, then a terminal block 1747 returns an OK character, which can be a predetermined number, to the main program. The main program senses the return signal to ascertain the three registers contain the adjustment data and makes the indicated adjustment as previously described.

While the invention has been particularly shown and described with reference to preferred embodiments thereof, it will be understood by those skilled in the art that various changes and modifications in form and details may be made therein without departing from the spirit and scope of the invention according to the following claims.

What is claimed is:

1. A combination comprising:

processor means for executing sequences of preprogrammed operations;

input means coupled to the processor means for supplying coded input signals to the processor means;

monitor means for displaying, in color, information from the processor means, the monitor means including control means responsive to information embedded in color signals coupled to the monitor for regulating attributes of the display;

monitor driving means for coupling signals from the processor means to the monitor means and including means for adding adjustment information signals to the color signals coupled to the monitor;

separator means in the monitor means for receiving color signals from the monitor driving means, the separator means including means for extracting the adjustment information signals, decoding means responsive to the extracting means for coupling adjustment signals to the monitor control means; and means in said monitor means for detecting a signature code sequence validating the adjustment information signals.

2. The combination of claim 1 including means in said monitor driving means for modulating each RBB component of color signals according to the adjustment information signals.

3. The invention of claim 1 including means in the monitor driving means for varying vertical synchronization pulse widths according to the adjustment information signals.

4. The combination claimed in claim 2 wherein the means for modulating the color signals from the monitor driving means includes means for varying the RGB image amplitude of the RGB image color signals according to the adjustment information.

5. A video display system comprising:

means for supplying video data to be displayed;

means for supplying control data representing operating characteristics of a data display;

encoder means coupled to receive video data and control data for modulating video color component signals according to control data for supplying modified video color signals;

display means for displaying video data;

control means for controlling operating characteristics of the display means;

separator means in said display means receiving the modified video color signals for separating signals representing control data and for coupling the control signals to the control means and video color signals to the display means;

means for modulating a first color signal with binary signals representing the control data;

means for modulating a second color signal with enabling signals; and means for modulating third color signal with timing signals.

6. The video display system according to claim 5 further including:

means in said decoder means for inserting signature signals to indicate start of control signals; and means in said separator means for recovering signature signals.

7. The video display system according to claim 6 wherein said encoder means includes means for converting control signals from binary signals to analog signals.

8. The video display system according to claim 7 wherein the display means includes;

impedance means connected to circuits in the display means for controlling operating characteristics of the display means; and operating characteristic adjustment means coupled to the analog control signals from the control means for controlling the impedance means.

* * * * *